(12) United States Patent
Hartmann et al.

(10) Patent No.: US 6,525,812 B1
(45) Date of Patent: Feb. 25, 2003

(54) OPTICAL ARRANGEMENT FOR A LASER SCANNING MICROSCOPE

(75) Inventors: Nicole Hartmann, Goettingen (DE); Rafael Storz, Bammental (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 286 days.

(21) Appl. No.: 09/661,346

(22) Filed: Sep. 14, 2000

(30) Foreign Application Priority Data

Sep. 16, 1999 (DE) .......................... 199 44 355

(51) Int. Cl.$^7$ .................... G01N 21/63; G02B 21/06
(52) U.S. Cl. ........................ 356/318; 359/385
(58) Field of Search ............. 356/317, 318, 356/417; 250/458.1, 459.1, 461.1, 461.2; 359/368, 385

(56) References Cited

FOREIGN PATENT DOCUMENTS

DE 43 30 347 A1 3/1995
DE 199 06 757 A1 12/1999

*Primary Examiner*—F. L. Evans
(74) *Attorney, Agent, or Firm*—Simpson & Simpson, PLLC

(57) ABSTRACT

An optical arrangement in the beam path of a laser scanning microscope, with at least one adjustable spectrally selective element (2) adjustable to the wavelength of the excitation light from a light source (1), which couples the excitation light (3) from the light source (1) into the microscope (4) and which at least partly blocks the excitation light (3) scattered and reflected at the object out of the beam path (5) and does not block the detection light coming from the object, is intended to simplify the known design and to expand the previously possible detection variants. The optical arrangement is characterized in that another optical component (8) is placed after the element (2), after passing which the dispersive and/or birefringent properties of the detection light are detectable.

13 Claims, 4 Drawing Sheets

OPTICAL ARRANGEMENT FOR A LASER SCANNING MICROSCOPE

CROSS-REFERENCE TO RELATED APPLICATIONS

The present application claims foreign priority under 35 U.S.C. §119 of German Application No. 199 44 355.6 filed Sep. 16, 1999.

BACKGROUND OF THE INVENTION

1. Field of the Invention

This invention concerns an optical arrangement in the beam path of a laser scanning microscope, with at least one adjustable spectrally sensitive element at the wavelength of the excitation light from a light source, which couples the excitation light from the light source into the microscope, at least partially blocks out excitation light scattered and reflected at an object, and does not block out the detection light coming from the object.

2. Description of the Related Art

Laser scanning microscopes of the generic type are known from the German Patent Application 199 06 757.0. AOTFs (Acousto-optical tunable filters) can be used, for example, as adjustable spectrally selective elements. They are generally birefringent crystals. Because of their birefringence, randomly polarized detection light is divided into two polarized partial beams, that is, into an ordinary and an extraordinary beam. The two beams are spatially separated after they pass through the crystal. Because of their pattern, the crystals do not have a cubic shape. Therefore polychromatic light is separated into its spectral components due to dispersion.

There are substantial problems in use of an adjustable spectrally selective element in the beam path of a laser scanning microscope because of the properties described above, as normally only a single non-separated detection beam is detected. The dispersed and divergent detection light must pass through an additional optical arrangement for detection to reduce the undesired effects of the adjustable spectrally selective element. Therefore it is necessary to follow the adjustable spectrally selective element by a second element of the same construction which makes the detection beam parallel after it passes through. Both those two elements are followed by a third optical element so that the parallel detection beam, comprising many detection partial beams, is converted to a convergent beam. Finally, a fourth element of the same design follows the three elements. It is able to reverse the dispersive and birefringent action of the first element. This arrangement is extremely tedious to adjust, is of substantial size, and is very expensive, primarily because of its use of four identical crystals.

SUMMARY OF THE INVENTION

This invention is based on the objective of designing and developing an optical arrangement in the beam path of a scanning laser microscope so as to allow simplification of the design of the long-known arrangement, and so to reduce the cost and expand the variations for detection previously provided. Such microscopes are known to have a light source, at least one adjustable spectrally selective element adjustable to the wavelength of excitation light from said light source for coupling in the excitation light from the light source into the microscope and at least partly blocking the excitation light scattered and reflected at an object from the detection beam path while transmitting detection light coming from the object on the beam path.

This objective is attained by an optical arrangement characterized by the fact that the adjustable spectrally selective element is followed by another optical component such that, after passing through it, the dispersive and/or birefringent properties of the detection light are detectable.

It is first recognized, according to the invention, that because of the birefringent property of an adjustable spectrally selective element which is used, a randomly polarized detection beam is separated into two detection partial beams with mutually perpendicular polarizations and—assuming that there is a suitable detection device—they can be examined with particular respect to their polarization properties. Thus it is possible to make a polarizing laser scanning microscope. Because the distance from the adjustable spectrally selective element to the detector cannot be arbitrarily small, because of the structure, and because the detection light diverges after passing through the adjustable spectrally selective element, it has been possible to detect the light only with an overly large detector. The detector still had to have sufficient sensitivity with the same signal/noise ratio, because the total intensity per unit area of the detection light, already weak, is further reduced when distributed over a larger area. Therefore, another subsequent optical component is needed for effective detection. This component particularly converts the divergent light to non-divergent light so that it can be detected with detectors of ordinary size and sensitivity. It is also possible, in a manner according to the invention, to provide detection with respect to the dispersive properties of the detection light after passage through the element and the component.

An AOTF (acousto-optically tunable filter), an AOM (acousto-optical modulator) or an AOD (acousto-optical deflector) can be used as the adjustable spectrally selective element and as the other optical component. A birefringent crystal, a prism, or a lens could serve as the further optical component. A combination of the various optical components is also conceivable. For instance, an AOTF could be used as an adjustable spectrally selective element which is combined with a birefringent crystal as the optical component following the element.

It is very advantageous, for further processing of the detection light, divided into partial beams by the element, for the component to be placed after the element so that the light beams of the detection light emerge as nearly parallel as possible after passing through the component. If two elements of the same structure are used, that can be accomplished, for instance, with a mutually point-symmetric arrangement of the two components so as to take into consideration the particular form of component used in general. It is advantageous for the detection light to occur as parallel light beams after passing through the element and the component so that, as is usual in a conventional microscope, an infinite detection beam path is produced.

Depending on the actual applicational requirements for the laser scanning microscope to be made, it can be advantageous to detect a partial detection beam. Likewise, two or more detection partial beams can be detected simultaneously.

Multiple detection partial beams can be detected with separate detectors, with the detection partial beams preferably detected simultaneously. For practical accomplishment of the detection of multiple detection partial beams with a least one detector, it is advantageous to place at least one beam diverter in an appropriate detection partial beam path and arrange it so that the corresponding detection partial beam is directed to the detector assigned to it. The corresponding beam diverter is assigned to the element and the component so that the detection beam, which passes through the element and the component and is as nearly parallel as possible can be directed to the corresponding detector in unaltered beam form, because this is, due to the construction, for example, placed farther away from the element and the optical component.

With respect to an actual embodiment, the beam diverter could be made movable so that it could be placed in each of the detection partial beam paths. For example, if there were two detection partial beams, either one or the other detection partial beam could be detected with only one detector, depending on the instantaneous position of the movably mounted beam diverter. Quite generally, any detection partial beam could be detected in this manner by one detector. That is particularly advantageous if the laser scanning microscope is to have a very expensive detector selected for its detection characteristics, which is, for example, particularly low in noise, or is very sensitive in a particular wavelength region.

The detected detection partial beam can be a polarized ordinary beam of the detection light. Alternatively, it is also possible to detect the polarized extraordinary beam of the detection light. In one preferred embodiment, both the polarized partial beams are detected simultaneously with two separate detectors. This process gives a laser scanning microscope which can detect the detection light with respect to its polarization properties without inserting components such as a polarizer and analyzer, usually required, into the microscope beam path.

It is also possible, advantageously, to detect the properties of the detection light with a multiband detector or with a spectrometer. A multiband detector is known from German Patent DE 43 30 347 C2. Its content is assumed known, and is expressly included here. The dispersion of the detection light produced by the adjustable spectrally selective element can be utilized so that the multiband detector or spectrometer following the element and the optical component considers and furthermore intensifies the dispersion already partially accomplished. The spectrometer can be either a grating or prism spectrometer.

With respect to an actual embodiment, it can be advantageous for at least one detection partial beam to be blocked out of the detection beam path by a blocking means. A beam trap such as is commonly used in optical systems can serve as the blocking means. The blocking means could be movably mounted so that it can act intentionally on one or multiple detection partial beams. The means for moving the movably mounted blocking means is preferably in a plane perpendicular to the detection beam path.

A beam deflector can be placed after the element and the component in a manner according to the invention so that the light coming from the object, after passing through the element and the component, is reflected back so that the detection light can be detected by at least one detector after its second passage through the component and the element. This optical arrangement, comprising the adjustable spectrally selective element, the other optical component, and the beam diverter, has an action identical to the arrangement known from the state of the art, comprising four identical crystals placed in succession. Both arrangements can recombine the divergent and dispersively spread out detection light split up by the adjustable spectrally selective element into multiple partial beams back into a single coaxial detection beam. The design suggested here is, therefore, of considerable advantage, because only two instead of the four crystals are needed, the total size of the arrangement is reduced, adjustment work is reduced, and the cost can be reduced.

The beam diverter can be formed by an at least partially reflectorized rear side of the optical component. This can further reduce the number of components in the optical arrangement as well as the degrees of freedom in the adjustment.

With respect to an actual embodiment, the beam diverter is arranged and positioned so that the detection beam path running toward the beam diverter is at least slightly tilted in relation to the beam path running back from the beam diverter. It is advantageous to select the angle of tilt so that it is greater than 0 and smaller than 20 degrees. Then the detection light, after a double passage through the element and the component has a spatial beam displacement with respect to the detection light from the microscope so that the detection light reflected from the beam diverter can be directed from at least one further beam diverter to at least one detector.

The beam diverter following the element and the component is advantageously designed such that only one specifiable number of the detection partial beams coming from the object is reflected back into the component and the element. In this way, the beam diverter does not act on all the detection partial beams, so that, in an advantageous manner, only one specifiable portion of the detection light passes twice through the element and the component and so can be detected with appropriate detectors as a filtered coaxially recombined light beam.

In one preferred embodiment, both the detector beams emerging from the element and the component, as well as the detection partial beams reflected back into the component and the element are detected simultaneously with one detector. In particular, the detection partial beams reflected back into the component and the element can be detected as a recombined detection beam with a detector after passing through the component and the element. The detection partial beams emerging from the element and the component can likewise be detected simultaneously with the appropriate number of detector. In this case it is of considerable advantage for the beam diverter following the element and the component to be provided with at least one passage through which one or more detection partial beams leaving the element and component can pass out, while all the other detection partial beams are reflected back again into the component and the element. This beam diverter, with at least one passage, could be movable so that, for instance, only the polarized ordinary detection partial beam can pass through the beam diverter at one appropriate position of the beam diverter. The direction of movement of the movably arranged beam diverter is preferably in a plane perpendicular to the detection beam path.

A corresponding detection partial beam passing through the beam deflector could be detected by a detector. For that purpose, the corresponding detector could be combined directly with the beam diverter having a passage, so that no other optical components are needed. It is also conceivable that a detector measures a detection partial beam reflected back into the component and into the element.

The detection light can advantageously be detected after either single or double passage through the element and the component by removing from the beam path, or placing in the beam path, a movably mounted beam diverter which acts on all the detection partial beams and which is placed to follow the element and the component. In this way it is possible to switch, with very simple means, between two detector variants according to the invention.

Ordinary mirrors which reflect the detection partial beams, or the detection beam path, in the desired direction could be used as beam diverters. A phase-conjugate mirror would also be conceivable as a beam diverter. Aside from diverting the light, it would also be able to compensate or reverse distortions of the wave fronts of the detection light.

BRIEF DESCRIPTION OF THE DRAWING FIGURES

Now there are various possibilities for embodying and developing the teaching of this invention in an advantageous way. In that respect, see the claims subordinate to Patent claim 1, and to the following explanation of the example embodiments of the invention by means of the drawings. The generally preferred embodiments and developments of the teaching are also explained in connection with the explanation of the preferred example embodiments of the invention by means of the drawings. The drawings show these schematic representations:

DETAILED DESCRIPTION OF THE PREFERRED EMBODIMENTS

Figure 1:
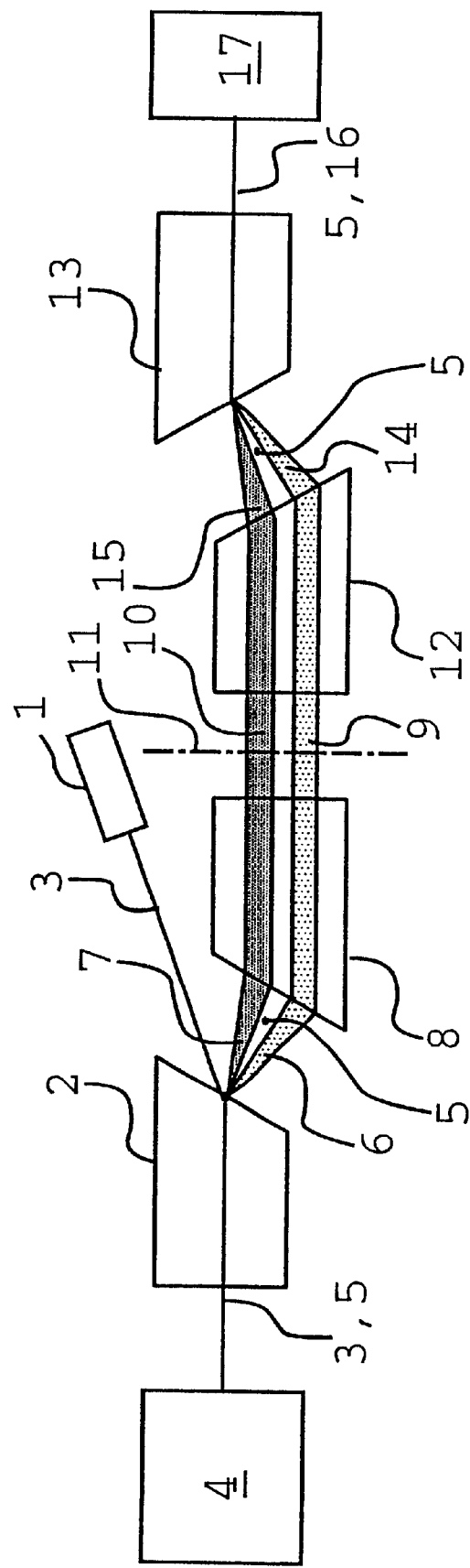
FIG. 1 shows an arrangement in the beam path of a laser scanning microscope which is known from the state of the art.

The schematic representation of FIG. 1 shows a generic optical arrangement in the beam path of a laser scanning microscope, having a light source 1 at the wavelength of the excitation light, an adjustable spectrally selective element 2 which couples the excitation light 3 from the light source 1 into the microscope 4, which at least partially blocks excitation light scattered and reflected at the object from the detection light path 5, and does not block detection light coming from the object out of the detection beam path 5. Because of the shape and manner of action of the element 2, the detection light leaving element 2 is divergent. It is split into at least two detection partial beams 6 and 7, both of which are dispersed. By means of an element 8 following element 2, which is of construction identical to 2 and is arranged point-symmetrically with 2, it is possible to convert the diverging detection partial beams 6, 7 at least as much as possible into parallel detection partial beams 9, 10. With respect to the mirror axis 11 indicated, two other elements 12, 13 are placed following the first two elements 2, 8 so that the parallel detection partial beams 9, 10 are first converted into convergent detection partial beams 14, 15 after passing through the element 12. Finally, those detection partial beams, after passing through the element 13, are converted into a single coaxial detection beam 16, which is then detectable by the detector 17.

Thus the elements 8, 12, and 13 following the adjustable spectrally selective element 2 act only to reverse the effects of element 2. the optical arrangement of FIG. 1 is, aside from its use of four expensive crystals in the detection beam path, tedious to adjust and also quite large.

According to the invention, the optical arrangement in the beam path of a laser scanning microscope has another optical component 8 in the beam path after the element 2. After passing through this component, the dispersive and/or birefringent properties of the detection light are detectable. Here the element 2 and element 8 are each an AOTF (acousto-optic tunable filter), with only element 2 designed as an active optical element. Component 8 is placed after element 2 so that the light beams of the detection light emerge as parallel as possible after passing through element 2 and component 8. For that purpose, the arrangement of component 8 relative to element 2 is made point-symmetric, as can be seen, for example, from FIG. 2. Here component 8 is at an appropriate distance, and is displaced, so that the detection light can pass through component 8 with minimum loss and without internal reflections.

Figure 2:
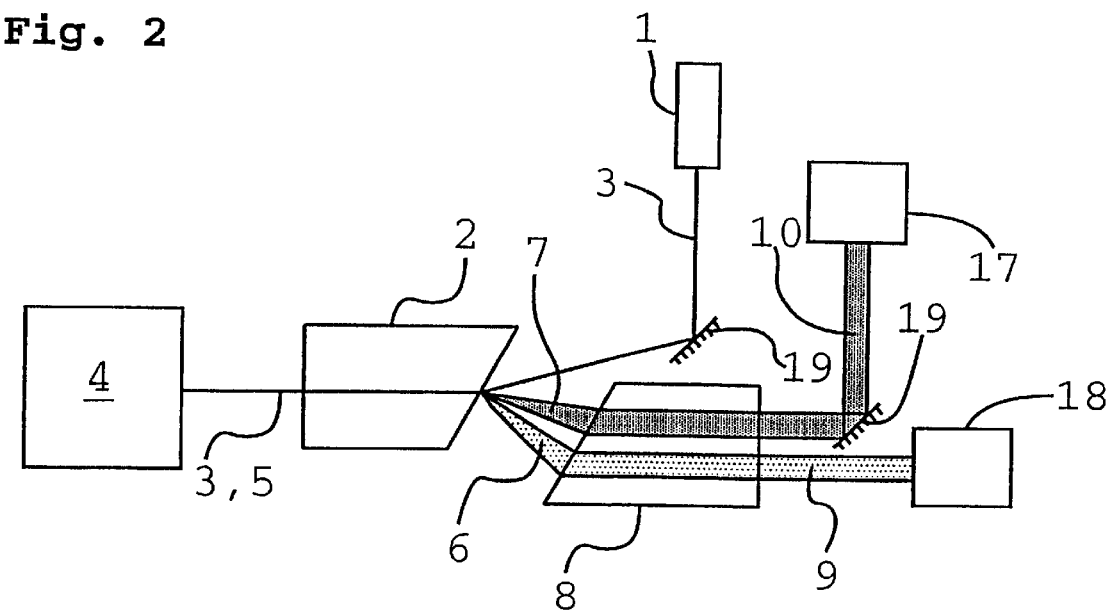
FIG. 2 shows an optical arrangement in the beam path of a laser scanning microscope according to the invention.
Figure 3:
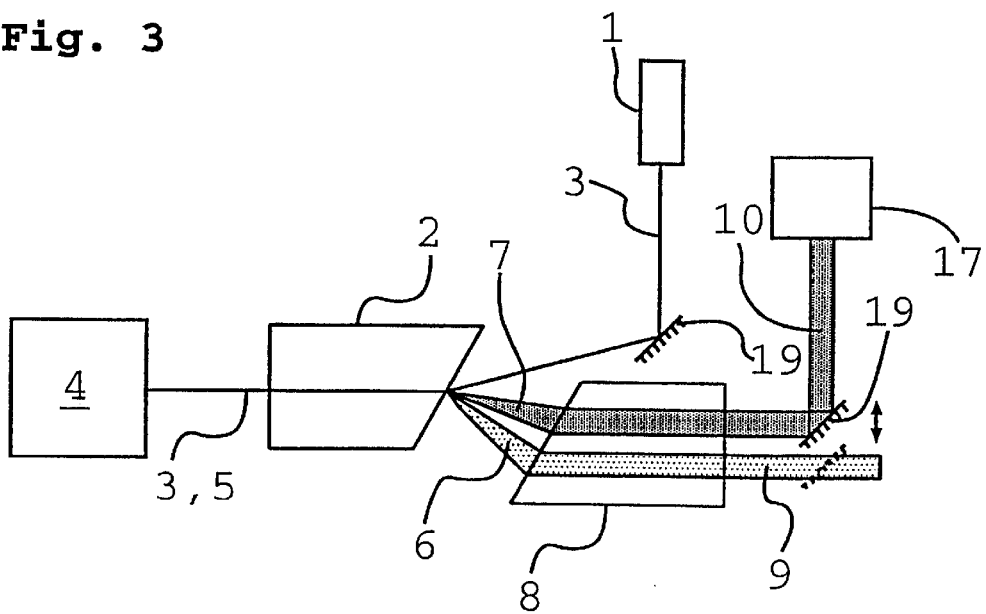
FIG. 3 shows the optical arrangement of FIG. 2 with an additional detector provided.

In one actual embodiment, only one detection beam is detected; see FIG. 3. In an alternative embodiment, two detection beams are detected simultaneously after component 8, as shown in FIG. 2. Here the detection partial beams 9 and 10 are detected with the detectors 17 and 18 following element 2 and component 8. In this case, the two detection partial beams 9, 10 are detected simultaneously. FIG. 2 also indicates that a beam diverter 19 follows component 8, directing the detection partial beam 10 to detector 17.

In an alternative embodiment, a laser scanning microscope has only one detector 17, as shown in FIG. 3. Here, a beam diverter 19 is advantageously arranged to be movable so that it can be positioned in both of the detection partial beam paths 9 and 10 shown there. Thus detection partial beam 10 or detection partial beam 9 can be detected with detector 17, depending on the position of the movable beam diverter 19. In this example embodiment, detector 17 has a very highly sensitive detection characteristic in both the wavelength regions to be detected. It is further distinguished by special cooling, which assures a nearly negligible noise component.

With the detection partial beams 9 and 10 shown in FIGS. 2 and 3, partial beam 9 is the ordinary polarized beam and partial beam 10 is the extraordinary polarized beam.

In the example embodiments of FIGS. 2 and 3, the detectors 17 and 18 are designed as multiband detectors which take the spectral dispersion of the individual detection partial beams 9 and 10 into consideration and amplify them advantageously. Because of the parallel nature of the detection partial beams 9 and 10 there, the arrangement of the detectors 17 and 18 is not critical with respect to their distance from component 8. That gives the instrument design another degree of freedom.

Figure 6:
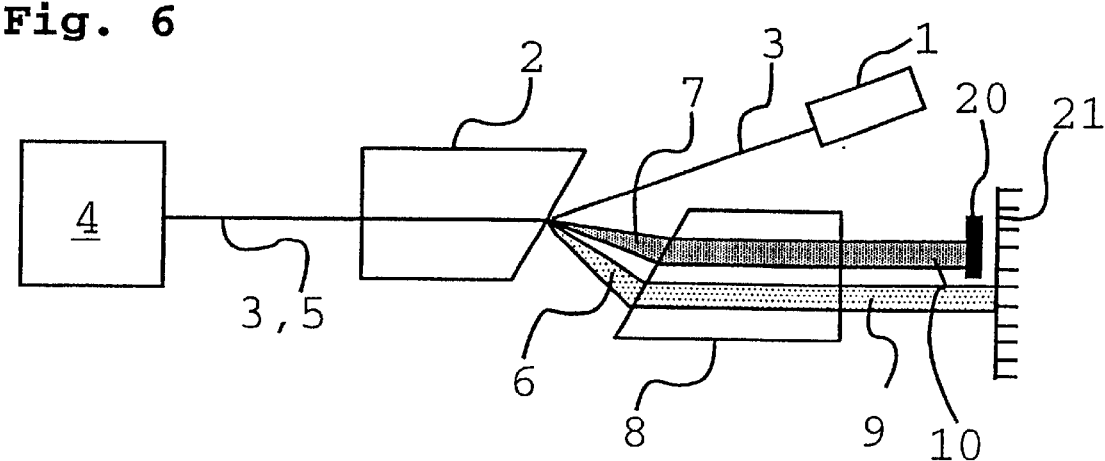
FIG. 6 shows an optical arrangement with a blocking means.

In the actual design from FIG. 6 a blocking device 20 is implemented in the form of a beam trap. Thus the detection partial beam 10 is not considered for the detection.

Figure 4:
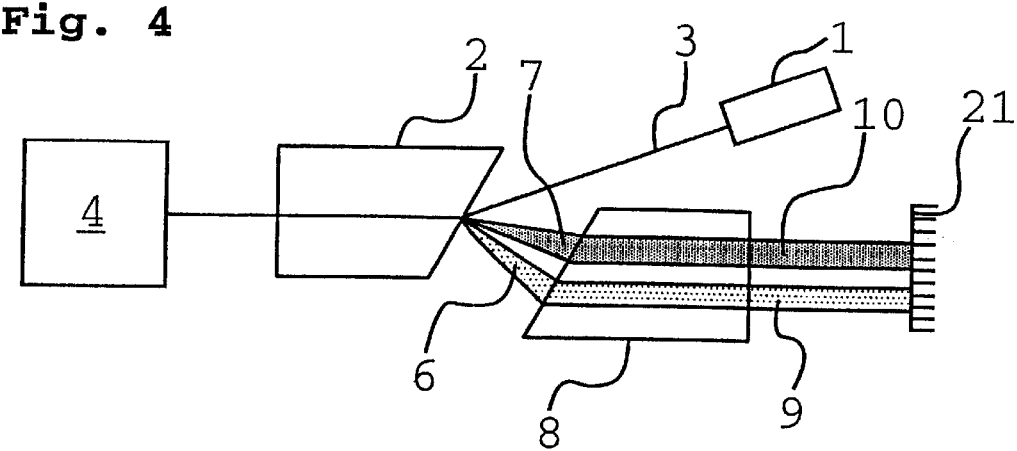
FIG. 4 shows an optical arrangement in the beam path of a laser scanning microscope in which the detection light is reflected back after passing the element and the component.

As can be seen from the design of FIG. 4, element 2 and component 8 are followed, according to the invention, by a beam diverter 21. It reflects the detection light coming from the object or microscope, after passing element 2 and component 8, back so that the detection light, after passing a second time through component 8 and element 2, is detectable by a detector not shown in FIG. 4. With the beam deflector 21, elements 12 and 13 shown in FIG. 1 can be omitted to advantage. A recombined detection beam is still detectable, after the detection light has passed twice through elements 2 and 8. The arrangement according to the invention has substantial advantages, particularly with respect to adjustment of the two optical components 8 and 21 following element 2, compared with the design of FIG. 1, where there are three identical elements 8, 12 and 13 following element 2.

Figure 5:
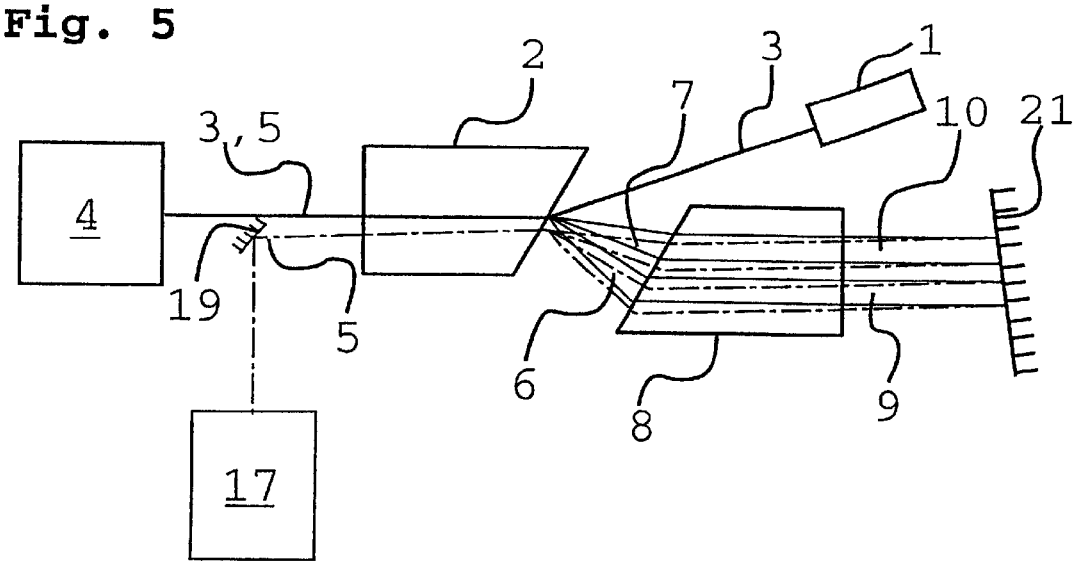
FIG. 5 shows the tilted arrangement of the beam diverter of FIG. 4.

The beam diverter 21 is arranged and positioned so, as shown in FIG. 5, that the detection beam path incident on the beam diverter 21 is tilted with respect to the detection beam path reflected back from the beam diverter 21. The incident detection beam path is shown with solid lines in FIG. 5, while the beam reflected back from the beam diverter 21 is shown with dot-dash lines. The tilt angle between the two detection beams is preferably 10 degrees. In FIG. 5, though, the beam deflector 21 is tilted by a larger angle for a better representation.

Because of the tilted arrangement of the beam deflector 21, the detection light reflected back into component 8 and element 2, shown with dash-dots, is displaced laterally from the detection beam path coming from the microscope 4. Thus the detection light can be directed from another beam diverter 19 to the detector 17 after a second passage through element 2 and component 8.

In the design of FIG. 6, only one of the detection partial beams, 9, is reflected back into component 8 and element 2. The detection partial beam 10 is blocked out of the detection beam path by the blocking means 20.

Figure 7:
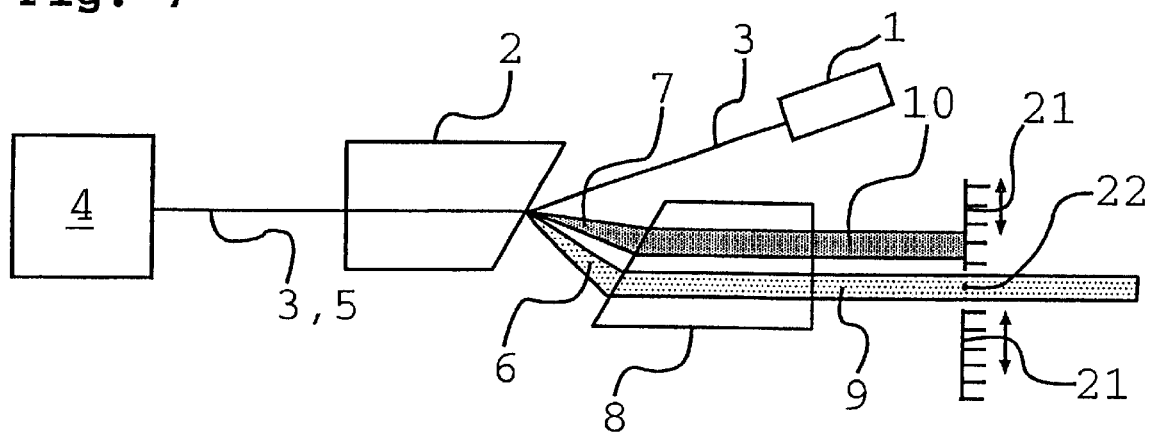
FIG. 7 shows a beam diverter provided with a passage following the element and the component.

FIG. 7 shows a preferred embodiment in which both the detection partial beam 9 leaving element 2 and component 8, and the detection partial beam 10 reflected back into component 8 are detected with a detector (not shown). Here the beam diverter 21 following element 2 and component 8 has a passage 22 which allows the detection partial beam 9 to pass to the detector (not shown). In this design, as also in that of FIG. 5, the beam diverter is tipped advantageously (not shown in FIG. 7) so that the detection partial beam 10 reflected back into component 8 and element 2 also has, after its passage, a lateral displacement from detection beam 5 coming from the microscope 4. Thus the back-reflected detection partial beam 10 is directed to a detector (not shown in FIG. 7) with a beam deflector (also not shown in FIG. 7). The beam diverter 21 is advantageously made movable and positionable so that either the detection partial beam 9 or the detection partial beam 10 can pass to the beam diverter 21. It is advantageous to place a multiband detector, not shown in FIG. 7, after the beam deflector 21 with a passage 22. The multiband detector fturther disperses and detects the detection partial beam that passes the beam diverter 21. The partial beam reflected back by beam diverter 21 into component 8 and element 2 is advantageously detected by an ordinary detector designed as a photomultiplier, not shown in FIG. 7.

Figure 8:
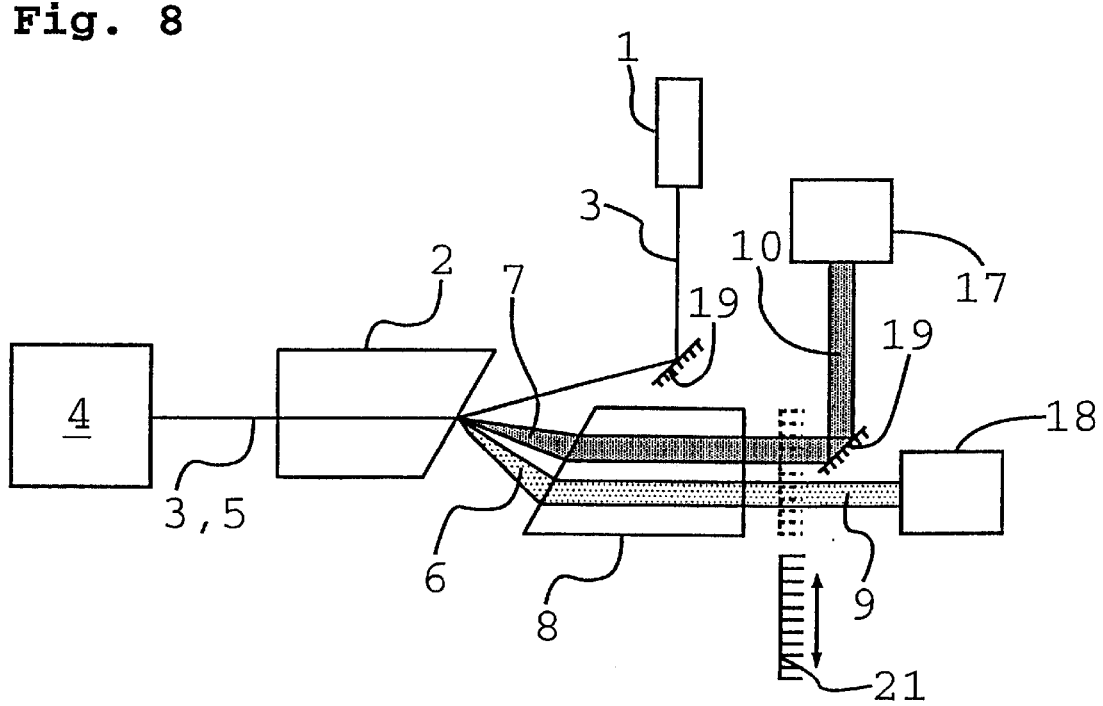
FIG. 8 shows an optical arrangement in the beam path of a laser scanning microscope, in which a movably mounted beam diverter is positionable in the detection beam path.

In the embodiment of FIG. 8, an optical arrangement is shown in the beam path of a laser scanning microscope. It has a beam diverter 21 which is movable and acts on detection partial beams 9 and 10. Depending on the position of the beam diverter 21, the detection partial beams 9 and 10 are detected with detectors 17, 18 after a single passage through element 2 and component 8. If the movable beam deflector 21 is in the detection beam path, both detection partial beams 9 and 10 are reflected back through component 8 and element 2, where they can then be detected according to the design of FIG. 5 with an appropriate detector which is not shown in FIG. 8. Ordinary mirrors are used as beam diverters 19 and 21 in all the embodiments in FIG. 2 to FIG. 8.

Another example embodiment of the design of the spectrally selective element 2 is that element 2 and/or optical component 8 is an AOM (Acousto-Optical Modulator). Another embodiment of the spectrally selective element 2 is that the optical component 8 is designed as an AOD (Acousto-Optic Deflector). Optical component 8 can also be designed as a birefringent crystal, prism, and cylindrical lens.

The detection partial beams are directed to the appropriate detectors 17 and 18 for detection of one or more detection partial beams 9 after the component.

The beam diverters 19 and 21 provided in the arrangement are made as mirrors or as phase-conjugate mirrors.

Finally, it must be particularly noted that the example embodiments explained above serve only to describe the claimed teaching, but it is not limited to the example embodiments, which are chosen entirely arbitrarily.

LIST OF REFERENCE NUMBERS

1 Light source
2 adjustable spectrally selective element
3 Excitation light
4 Microscope
5 Detection beam path
6, 7 Detection partial beam paths
8 Element, further optical component
9, 10 Initially parallel detection partial beams
11 Axis of symmetry
12, 13 Optical element
14, 15 Converging detection partial beams
16 Recombined detection beam
17, 18 Detectors
19 Beam diverter
20 Blocking means
21 Beam diverter
22 Passage in (21)

What is claimed is:

1. An optical arrangement in a beam path of a laser scanning microscope, said microscope having a light source, at least one adjustable spectrally selective element adjustable to the wavelength of excitation light from said light source for coupling in said excitation light from said light source into said microscope and at least partially blocking said excitation light scattered and reflected at an object from said beam path while transmitting detection light coming from said object on said beam path, wherein said optical arrangement comprises:
   an optical component after said at least one adjustable spectrally selective element in said beam path for dispersion and/or birefringence of said detection light;
   at least one detector after said optical component in said beam path for receiving at least a portion of said dispersed and/or doubly refracted detection light, and
   at least one beam diverter for directing the at least a portion of said dispersed and/or doubly refracted detection light to said at least one detector.

2. The optical arrangement according to claim 1, wherein said detection light emerges from said optical component as a plurality of detection partial beams which are as nearly parallel as possible.

3. The optical arrangement according to claim 2, wherein said at least one beam diverter is disposed after said optical component in said beam path for directing at least one of said plurality of detection partial beams to said at least one detector.

4. The optical arrangement according to claim 3, wherein said at least one beam diverter is selectively positionable to direct a chosen one of said plurality of detection partial beams.

5. The optical arrangement according to claim 2, further comprising a movable blocking means for selectively blocking a chosen one of said plurality of detection partial beams from said beam path.

6. An optical arrangement in a beam path of a laser scanning microscope, said microscope having a light source, at least one adjustable spectrally selective element adjustable to the wavelength of excitation light from said light source for coupling in said excitation light from said light source into said microscope and at least partly blocking said excitation light scattered and reflected at an object from said beam path while transmitting detection light coming from said object on said beam path, wherein said optical arrangement comprises:

an optical component after said at least one adjustable spectrally selective element in said beam path for dispersion and/or birefringence of said detection light, wherein said detection light emerges from said optical component as a plurality of detection partial beams which are as nearly parallel as possible;

a first beam diverter after said optical component in said beam path for reflecting at least a portion of said detection light back through said optical component and said at least one adjustable spectrally selective element to provide a recombined detection beam; and at least one beam detector including a first beam detector for receiving said recombined detection beam.

7. The optical arrangement according to claim 6, further comprising a second beam diverter positioned to receive and redirect said recombined detection beam to said first beam detector.

8. The optical arrangement according to claim 6, wherein said first beam diverter is arranged and positioned so that said beam path going back from said first beam diverter is at a slight angle relative to said beam path going to said first beam diverter.

9. The optical arrangement according to claim 8, wherein said angle is greater than 0 degrees and less than 20 degrees.

10. The optical arrangement according to claim 6, wherein said first beam diverter reflects back into said optical component and said at least one adjustable spectrally selective element only a specifiable number of said plurality of detection partial beams.

11. The optical arrangement according to claim 10, further comprising at least one additional beam detector for receiving a partial beam not reflected back by said first beam diverter, whereby said partial beam not reflected back and said recombined detection beam are simultaneously detected.

12. The optical arrangement according to claim 10, wherein said first beam diverter is provided with at least one passage.

13. The optical arrangement according to claim 6, wherein said first beam diverter is selectively movable into said beam path to reflect said plurality of detection partial beams back through said optical component and said at least one adjustable spectrally selective element and out of said beam path to allow said plurality of detection partial beams to pass, whereby said detection light is detectable after either a double or a single pass through said at least one adjustable spectrally selective element and said optical component.

* * * * *